United States Patent Office 3,403,169
Patented Sept. 24, 1968

3,403,169
ADDITION OF ORGANOMETALLIC COMPOUNDS TO ACTIVATED OLEFINS
Bernard Rudner and George S. Achorn, Pittsburgh, and Paul M. Hergenrother, Wampum, Pa., assignors to Koppers Company, Inc., a corporation of Delaware
No Drawing. Filed Aug. 23, 1963, Ser. No. 304,220
7 Claims. (Cl. 260—346.3)

This invention relates to the addition of organometallic compounds to activated olefins. In one specific aspect, it relates to the free radical initiated addition of a Group IV–A metallo-organic compound to an activated olefin.

Heretofore, the only general practical method for converting organometallic compounds of Group IV–A elements, such as silanes, to cyanoalkyl, carbalkoxyalkyl, etc., derivatives was by the reaction:

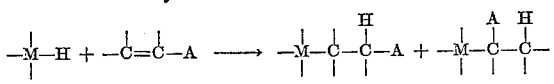

Unfortunately this method suffers from various disadvantages in that (a) the reaction requires the use of metal hydrides and will not operate for compounds of the formula $R_4M$, $R_3MCl$, etc. which lack hydrogen atoms bonded directly to the metal atom; (b) the reaction is not applicable to all Group IV–A metal and metalloid derivatives since it can not be used for lead hydrides; and (c) it gives appreciable quantities of unstable alpha-carboxy, alpha-carbalkoxy products by the reaction:

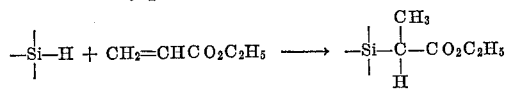

which readily loses carbon monoxide and, by C—O—C rearrangement to Si—O—C, is no longer an ester but an alkoxysilane.

Quite surprisingly we have discovered a new method for the preparation of functionally substituted organometallic compounds of Group IV–A elements which overcomes the disadvantages of the prior art. This method occurs in the absence of metal hydride bonds, is generally applicable to all Group IV–A elements having an atomic number of 14–82, and does not give appreciable quantities of unstable products.

It is therefore an object of the present invention to provide a new general method of making functionally substituted organometallic compounds of Group IV–A elements.

It is another object of the present invention to provide new functionally substituted organometallic compounds.

In accordance with our invention we have discovered a new method of making functionally substituted organometallic compounds by reacting at a temperature of 50–250° C. in the presence of a free radical forming initiator (a) a compound of the formula:

$$R_2CHMY_y$$

wherein M is an element of Group IV–A of the Periodic Table having an atomic number of 14–82 inclusive, each R independently can be hydrogen, and univalent hydrocarbon residue having 1–17 carbon atoms or collectively with CHM complete a heterocyclic ring having 3–8 annular carbon atoms, or with CHM complete the unit of a polymeric chain of the structure $\{(CH_2)_nMY_2\}$ wherein n is an integer having a value of 1–8, or R collectively with the other R and CH complete a saturated carbocyclic ring of 3–8 annular carbon atoms; Y can be halogen, aryl, $R_2CH$, or collectively with M complete a metal oxane of 2–500

units, $y$ is an integer having a value between 1 and 3 inclusive, such that the total substituents of M are always 4; with (b) an activated olefin of the formula:

$$A\overset{R'}{C}=CHR'$$

wherein each R' independently can be hydrogen, lower alkyl, phenyl or the two R's collectively with C=CH complete a cycloalkene ring of 5–8 annular carbon atoms or either R' completes with A and the carbon atoms to which the A and R' are attached a cyclic anhydride or imide group of 5–6 annular atoms; and A can be cyano, carboxy, carbalkoxy, carboxamide, and cyclic carboxylic anhydride and imide.

As we have set forth above, useful organometallic compounds can be represented simply by the formula:

$$R_2CHMY_y$$

wherein M represents silicon, germanium, tin, and lead atoms, and R, Y and $y$ are defined above.

Variations of M, e.g., from silicon to lead, cause variations in the ease of reaction, the physical state of the products, the stability of the products and even the utility of the products. Thus, while the non-toxic adduct of hexabutylcyclotrisiloxane and acrylonitrile would be most useful in the preparation of thermally stable, highly polar elastomers, the analogous product from hexabutylcyclotristannoxane (which intermediate is commercially available as dibutyltin oxide) would be more useful as a fungicide and preservative. Again, partly because of the known increasing ease of cleavage of the C—M bonds in going from C–Si to CPb, different yields can be expected when only the M group is varied. For example, addition of the

to an alpha unsaturated acid or anhydride gives increasing yields, as one goes from silicon to lead, of side reaction products involving cleavage and formation of

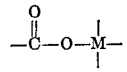

Further, because of the increasing atomic size in going from silicon to lead, the attached CH becomes more sterically hindered and therefore the desired reaction becomes less efficient.

The term R independently can be a "univalent hydrocarbon residue having 1–17 carbon atoms" as used herein means: alkyl having 1–17 carbon atoms, e.g., methyl, ethyl, propyl, hexyl, octyl, dodecyl, etc.; alkenyl having 2–17 carbon atoms, e.g., vinyl, allyl, 11-undecenyl, etc.; cycloalkyl having 3–8 annular carbon atoms, e.g., cyclopentyl, cyclohexyl, cyclooctyl, etc.; and aryl, e.g., phenyl, naphthyl, etc. If one of the R's in $R_2CH$ is vinyl, allyl, etc., then the CH may, being allylic, undergo addition to the activated olefin with or without a so-called "allylic shift" illustrated by the reactions

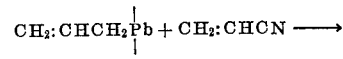

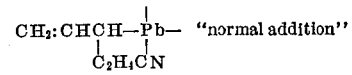 "normal addition"

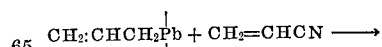

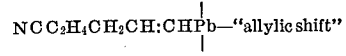 "allylic shift"

This arrangement does not always occur. The rules regarding the allylic shift are described generally in "Molecular Rearrangements," Paul de Mayo, New York, Interscience Publishers 1963.

Because of the known differences in stabilities of various halide compounds, variations in the halide (Y portion of $R_2CHMY_y$) produce differences in reaction efficiency and product stability. Thus, the molecular stability that makes $(CH_3CH_2CH_2)_2SiF_2$ more difficult to hydrolyze than $(CH_3CH_2CH_2)_2SiBr_2$, means that addition to e.g., maleic anhydride, gives less acyl addition for the difluorosilane than the dibromosilane.

TABLE I.—TYPICAL METALLO-ORGANIC COMPOUNDS

| Metallo-organic compounds | Structure |
|---|---|
| A. Organo-Silicon Compounds: | |
| Trihexylbromosilane | $(C_6H_{13})_3SiBr$ |
| Sec-amyltrifluorosilane | $CH_3CH_2CH_2\overset{CH_3}{\underset{\|}{C}}HSiF_3$ |
| Dicyclooctyldimethylsilane | $(C_8H_{15})_2Si(CH_3)_2$ |
| Didodecyldiphenylsilane | $(C_{12}H_{25})_2Si(C_6H_5)_2$ |
| Ethyltriethoxysilane | $(C_2H_5)Si(OC_2H_5)_3$ |
| Allyltrimethylsilane | $CH_2{:}CHCH_2Si(CH_3)_3$ |
| Triallylethoxysilane | $(CH_2{:}CHCH_2)_3SiOC_2H_5$ |
| 11-Undecenylphenyldichlorosilane | $CH_2{:}CH(CH_2)_8CH_2\overset{Cl}{\underset{\underset{Cl}{\|}}{Si}}C_6H_5$ |
| Dibenzyltetramethyldisiloxane | $\left[C_6H_5CH_2-\overset{CH_3}{\underset{\underset{CH_3}{\|}}{Si}}-O\right]_2$ |
| Bis(octadecyldiphenyl)disiloxane | $\left[C_{18}H_{37}\overset{C_6H_5}{\underset{\underset{C_6H_5}{\|}}{Si}}-O\right]_2$ |
| Cyclopentamethylenediphenylsilane | (cyclic structure with $CH_2-CH_2$, $CH_2$, $CH_2-CH_2$ and $Si(C_6H_5)_2$) |
| Tetramethyldisilacyclohexane | (cyclic structure with two $Si(CH_3)_2$ bridged by $C_2H_4$) |
| Dibenzylsiladioxacyclopentane | (cyclic structure $C_6H_5CH_2$, $Si$, $O-CH_2$, $O-CH_2$, $C_6H_5CH_2$) |
| Polymeric(phenylfluoropentamethylenesilane) | $\left[-C_5H_{10}\overset{C_6H_5}{\underset{\underset{F}{\|}}{Si}}-\right]_x$ |
| (Chlorophenylhexahydrobenzyl)silicone | (complex polymeric structure with S, CH₂, Si-O, Cl-phenyl) |
| B. Organo-germanium compounds: | |
| Methallyltriphenylgermane | $CH_2{:}\overset{CH_3}{\underset{\|}{C}}CH_2-Ge(C_6H_5)_3$ |
| Hexaethyldigermoxane | $\left[C_2H_5-\overset{C_2H_5}{\underset{\underset{C_2H_5}{\|}}{Ge}}-O\right]_2$ |
| Hexacyclohexyltrigermoxane |  $(C_6H_{11})_2Ge$ ... $Ge(C_6H_{11})_2$ with bridging O and $Ge(C_6H_{11})_2$ |
| C. Organo-tin compounds: | |
| Tetramethylstannane | $(CH_3)_4Sn$ |
| Tetra-n-butylstannane | $(C_4H_9)_4Sn$ |
| Tri(2-ethylhexyl)tin laurate | $(C_8H_{17})_3SnO_2C_{12}H_{23}$ |

| Metallo-organic compounds | Structure |
|---|---|
| Dibutyltin oxide | $(C_4H_9)_2Sn$ with cyclic $Sn-O-Sn-O$ structure bearing $(C_4H_9)_2$ groups |
| D. Organic-lead compounds: | |
| Tetramethyllead | $(CH_3)_4Pb$ |
| Tetraethyllead | $(C_2H_5)_4Pb$ |
| Methyethylbutylpropylplumbane | $\overset{CH_3}{\underset{\underset{C_2H_5}{\|}}{\underset{\|}{C_4H_9\overset{\|}{P}bC_3H_7}}}$ |

The activated olefins useful in our invention may be represented by the formula $$A\overset{R'}{\underset{\|}{C}}=CHR'$$

wherein A and R' are defined as above. An activated olefin is one which has a double bond in an alpha position relative to an electrophilic activator group as defined by A above, or one which has a double bond that shifts to an alpha position under conditions of the reaction, e.g., by allylic shift. Typical activated olefins include: alpha unsaturated acids, e.g., acrylic acid, methacrylic acid, crotonic acid, maleic acid, fumaric acid, itaconic acid, citraconic acid, cinnamic acid, sorbic acid, aconitic acid, butadiene-2,3-dicarboxylic acid, and 3-methoxybenzylidenemalonic acid; alpha unsaturated esters, e.g., ethylacrylate, t-butylmethacrylate, propylcrotonate, diisooctylmaleate, di-s-butylfumarate, diethylitaconate, dicyclohexylcitraconate, methylcinnamate, ethylsorbate, ethyl-2-undecenoate, and coumarin; alpha unsaturated nitriles, e.g., acrylonitrile, methacrylonitrile, crotononitrile, cinnamonitrile and p-chlorocinnamonitrile; alpha unsaturated anhydrides, e.g., maleic anhydride, itaconic anhydride, and citraconic anhydride; alpha unsaturated amides and imides, e.g., cinnamoyldimethylamide, acrylamide, crotonamide and N-phenylitaconimide.

The reaction requires the presence of a free radical initiator. Most commonly available free radical initiators are effective. These include: ultraviolet light; oxygen; peroxides, e.g., t-butyl peroxide and benzoyl peroxide; hydroperoxides, e.g., t-butyl hydroperoxide, cumene hydroperoxide, and dimethylhexane dihydroperoxide; peresters, e.g., t-butylperbenzoate, t-butylperphthalate, and t-butylpervalerate; peranhydrides, e.g., acetyl peroxide, dibenzoyl peroxide, and dilauroyl peroxide; percarbonates, e.g., diisopropylperoxydicarbonate; aliphatic azo compounds, e.g., azobisisobutyronitrile, and azobisformamide; sulfonazides, e.g., benzenesulfonylazide and benzenesulfonylhydrazide; triazenes, e.g., triphenyltriazene; hydrozones, e.g., hydrazobenzene; azines, e.g., acetonazine; and N-nitrosoamines. Obviously, these are not equal in efficiency as reaction initiators, nor are they all useful at the same temperature. When, for example, a highly sensitive reactive organometallic such as an allyllead compound is to be reacted with a sensitive activated olefin, e.g., benzylidenemalonic acid, a low temperature is needed and therefore a thermally unstable free-radical former, such as one of the percarbonates or perphosphates is useful. Where the reaction is sluggish and must be heated extensively, as in the addition of a methyl siloxane to e.g., a cinnamic acid amide, a more stable free radical former, e.g., cumene hydroperoxide or heat plus ultraviolet light is more useful. The chemical free radical forming initiators are essentially catalysts, and are therefore generally useful in less than stoichiometric quantities. It is frequently advantageous to add such initiators intermittently.

The reaction is preferably run in the absence of solvents, but occasionally solvents may be used which are not reactive towards free radicals. The reaction may be run in an inert solvent, such as trichlorobenzene, aromatic hydrocarbons such as benzene, toluene, xylene, naphthane, tetralin, and the like. Carbon disulfide and saturated perfluorinated hydrocarbons may also be used but carbon tetrachloride and chloroform must be avoided.

The reaction temperature is determined by the free radical initiator, the activity of the olefin, and the reactivity of the alpha-hydrogen. In a system comprised of a free radical initiator decomposing at a low temperature, a very active olefin, and a highly reactive alpha-hydrogen containing compound, the reaction will occur at low temperatures even below 70° C. especially if ultraviolet light is also used as a free radical initiator. Another system involving a hindered olefin and a hindered alpha-hydrogen may require considerably higher temperatures, up to about 250° C. in which a free radical former decomposing at high temperatures should be used. The temperature of our reaction is in the range of from 50–250° C. with a range of 80–200° C. preferred.

The reaction pressure useful in our invention ranges from about 0.1 atmosphere to 10 atmospheres gage. Generally atmospheric pressure is preferred but for highly volatile olefins, such as acrylonitrile, or volatile organometallics, such as tetramethylsilane, superatmospheric pressure is required. Reduced pressures are advantageous in handling relatively involatile reactants e.g., flow reactor with recycle best run at less than atmospheric pressure to keep relatively involatile reactants and less volatile products fluid at higher temperatures without pyrolysis.

The products prepared according to the present invention have numerous general uses, a few of which are mentioned below merely for purposes of illustration. The anhydrides, e.g., trihexylbromosilanemaleic anhydride adduct, are epoxy cures which because of the silicon content impart low temperature flexibility and oxidation resistance; the anhydrides of chlorosilanes are useful in glass fibre reinforced resin manufacture. Adducts of the organometallic compounds and olefinic esters are useful as lubricants and plasticizers or may be converted to such use by simple transesterification; they may be converted to novel polyesters or alkyd resins by condensation with diols, triols, etc. Some of the products may be copolymerized, e.g., the unsaturated silane adducts may be copolymerized with styrene whereas others may be polymerized e.g., the nitriles and amide adducts to form highly polar resins. Specifically, commercial products or intermediates for commercial products include $(RO)_nSi(CH_2CH_2CN)_{4-n}$ for polar nitrile silicones, $R_nSi(OR')_{3-n}CH_2CH_2CN$ and its reduction product $R_nSi(OR')_{3-n}CH_2CH_2NH_2$ and the analogous $R_nSi(OR_2)_{3-n}CH_2CH_2CO_2C_2H_5$ all used for glass fiber reinforced resins; the amine is also used to make glass fibers receptive to acid dyes. The germanes, stannanes and plumbanes are useful similarly to the silanes, although there may be occasions when one metallic element is preferred over the other.

Our invention is further illustrated by the following examples.

EXAMPLE I

A four-necked flask equipped with a stirrer, nitrogen inlet, condenser and thermometer was charged with 50 ml. of 1,2,4-trichlorobenzene, 5.9 g. (0.06 mole) maleic anhydride and 121.2 g. (0.3 mole) trihexylbromosilane. After stirring for several minutes, 0.14 g. of di-tert-butyl peroxide was added and the flask heated to 143° C. After heating for three hours at 143° C., an additional 0.14 g. of di-tert-butyl peroxide was added and the temperature raised to 170° C. for three hours.

At the end of six hours of heating, the mixture was allowed to cool to room temperature. After the absence of peroxide was determined, the solvent and excess trihexylbromosilane were removed by distillation through a Vigreaux column. Unreacted maleic anhydride distilled over after the 1,2,4-trichlorobenzene and was recovered by removing it from the condenser where it sublimed.

The residue, 15.7 g. crude (dihexylbromosilyl)hexylsuccinic anhydride represented a yield of 56.7 percent based on charged maleic anhydride.

The neutralization equivalent of the residue was 223.1 as compared to a theoretical neutralization equivalent of 230.

Infrared analysis showed that the residue was the (dihexylbromosilyl)hexylsuccinic anhydride represented by the formula:

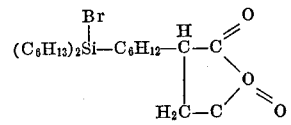

Hydrolysis of a portion of the residue with five percent sodium hydroxide solution produced a caustic-soluble and a water-soluble fraction. Acidification and ether extraction of both produced a resinous solid and a dark viscous liquid, respectively. The relative intensities of the alkyl and carbonyl absorptions in the infrared spectra indicated that the solid (caustic soluble) contains a larger proportion of maleic residues than the liquid, i.e., the solid is probably a di-(or higher) adduct.

The caustic solution was soapy in feel and foamed easily.

Attempts to repeat this reaction without solvents were unsuccessful, as were attempts to use other free-radical insensitive solvents such as benzonitrile. A single attempt to use a free-radical sensitive solvent, tetramethylene sulfone, at 110–135° C. was however unsuccessful.

EXAMPLE II

Di-iso-octyl maleate (17.0 g., 0.05 mole) containing tert-butyl peroxide (0.15 g.) was added during 1 hour at 135–155° C. to didodecyldiphenylsilane (52.0 g., 0.1 mole) under an argon atmosphere. The mixture was stirred at 155° C. for three hours and fractionated to give 10.7 g. (63 percent recovery) of unreacted ester boiling up to 157° C./0.35 mm. No other distillate came over with pot temperature at 260° C./0.35 mm. for 1.5 hours.

The residual brown liquor had an infrared spectrum which indicates that it was the crude di-octyl(dodecyldiphenylsilyl)dodecylsuccinate adduct. A portion (34.0 g.) of the brown liquid was hydrolyzed with aqueous potassium hydroxide-acetone mixture. Removal of the acetone and extraction of the resulting yellow alkali emulsion with n-hexane gave additional unreacted didodecyldiphenylsilane. Acidification of the alkali solution followed by extraction with diethyl ether gave 2.8 g. of an orange gum. The infrared spectrum appears to be consistent with that proposed for the carboxylic acid resulting from hydrolysis of the ester adduct. Assuming the orange gum to be a mono-adduct, the 2.8 g. represents a 42 percent yield, based on maleic anhydride consumed, of the original adduct, dioctyl(dodecyldiphenylsilyl)dodecylsuccinate.

EXAMPLE III

Tetra-n-butyltin (86.5 g., 0.25 mole), ethyl crotonate (5.7 g., 0.05 mole), di-t-butyl peroxide solution (5 ml., 0.12 g. in 20 ml. of 1,2,4-trichlorobenzene) were charged to a nitrogen-purged flask. The reaction mixture was stirred and heated to 142° C. for one hour. Then the temperature was raised to 167° C. over 1.5 hours and 7 ml. of peroxide solution was added dropwise. An additional 2.8 g. of ethyl crotonate was added to the remaining peroxide solution (7 ml.) which was added to the reaction mixture during 1.5 hours at 167–169° C. After complete addition, the clear light yellow solution became cloudy. Distillation gave, up to a pot temperature of 190° C. at 2 mm., unreacted ester, tetra-n-butyltin and other compounds. The residual brown liquid (1.9 g.) upon sitting, separated into a clear colorless liquid layer and a viscous brown liquid. The clear liquid was removed by careful washing with cold petroleum ether.

The residual brown liquid (1.0 g.) had an infrared spectrum consistent with the mono-adduct, ethyl(tributylstannyl)heptanoate.

EXAMPLE IV

Di-iso-octyl maleate (42.4 g., 0.125 mole) containing azobisisobutyronitrile (0.41 g., 0.0025 mole) was added dropwise in a nitrogen atmosphere over a period of 1.5 hours at 85–88° C. to allyltrimethylsilane (70.5 g., 0.62 mole). The solution was then stirred under an ultraviolet light at 85° C. for 15.5 hours. The resulting light yellow solution was fractionated to give allyltrimethylsilane and di-iso-octyl maleate. The orange viscous residue would not distill at a pot temperature of 260° C. at 0.5 mm. The infrared spectrum of the residue indicated free radical addition had occurred accompanied by an allylic shift to give principally compound I, rather than its isomer compound II.

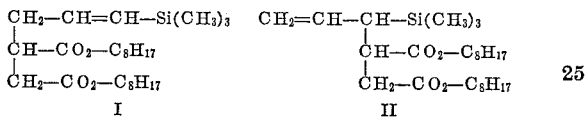

Thus, the infrared spectrum exhibited absorption characteristics of ester carbonyl at 5.79$\mu$, very weak —CH=CH— at 6.1, saturated ester C—O (succinate) at 7.95 and 8.6$\mu$. Absorptions at 8.0, broad at 11.8, 13.1 and 14.3 indicate the presence of Si—C bonds. The vinyl group has strong absorptions at 10.1 and 11.05$\mu$ which are not present in this spectrum indicating compound II is not present in any appreciable amount.

The residue is the desired crude 1:1 addition product, formed in a 64 percent yield.

EXAMPLE V

Following the procedure of Example I, the flask was charged with 88.8 g. (0.46 mole) ethyl-triethoxysilane, 22.6 g. (0.23 mole) maleic anhydride and 50 ml. 1,2,4-trichlorobenzene. The initiator solution was 0.58 g. (0.004 mole) di-t-butyl peroxide in 10 ml. of trichlorobenzene. The reaction was heated to 50° C. and 4 ml. of the initiator solution added. The reaction was then heated to 175° C. over a period of one hour and was held at 175–177° C. for 6½ hours, with the remaining initiator solution added in 2 ml. increments at 2, 4 and 6 hours from the initial addition. The product was fractionated into a relatively low boiling fraction (trichlorosilane and unreacted silane), a fraction collected between 80 and 100° C. at 0.05 mm. pressure, and a high boiling, dark viscous tar. The weights of the fractions were 131.5, 34.1 and 14.6 g., respectively. An infrared spectrum of the residue showed absorptions of fairly weak alkyl and anhydride carbonyl, strong ester carbonyl and weak unsaturation. Absorptions of Si-ethyl and Si—O—C were also observed. The middle cut (34.1 g.) was refractionated into six fractions of the following boiling ranges and weights:

|   | G. |
|---|---|
| (1) 48–62° at 0.02 mm. | 4.6 |
| (2) 62–76° at 0.02 mm. | 2.2 |
| (3) 76–84° at 0.02 mm. | 5.0 |
| (4) 84–87° at 0.01 mm. | 11.4 |
| (5) 87–100° at 0.01 mm. | 1.9 |
| (6) Residue | 5.7 |

Cut 4 showed the least anhydride, the most unsaturation and the strong ester carbonyl absorption maxima characteristic of the acyl adduct, ethyldiethoxy($\beta$-carbethoxyacryloyloxy)silane (Compound III). The less volatile distillate, cut 5, and distillation residue contained increasing quantities of both the desired adduct (triethoxysilylethyl) succinic anhydride (Compound IV) and other adducts, including presumably the olefin adduct of the acyl adduct. The products were characterized by spectra and such qualitative analysis procedures as hydrolysis.

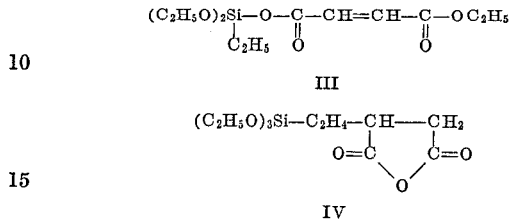

EXAMPLE VI

The crude product of an aluminum-ethylene-hydrogen-silicon tetrachloride reaction, a viscous brown oil containing predominantly disilacycloalkylene polymers of the general formula

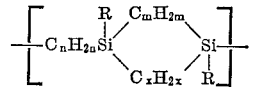

where the R's are simple hydrocarbon residues such that the total carbon content, including the n, m and x, averages about 8 carbon atoms for each silicon atom, was added to an equal weight (32.3 g.) of maleic anhydride and held in the presence of t-butyl peroxide at 169–173° C. for 7½ hours. High vacuum distillation removed among other compounds 19.9 g. unreacted anhydride, leaving, as a thick, dark brown residue, a mixture of desired polymeric adducts, the bulk of which were chloroform soluble but hexane and benzene insoluble (the starting alkylenesilane polymer was hexane soluble). The major fraction of the product mixture, 16.1 g. of clear, dark brown viscous liquid, had a saponification equivalent of 331, suggesting that each two "mers" of the structure shown have been substituted by an average of approximately one succinic anhydride unit (theoretical for a $C_{36}H_{61}Si_4O_4$ dicarboxylic acid, 334.5). The sodium salts are more soluble in alcohol than in aqueous alkali.

EXAMPLE VII

To a stirred mixture of cyclopentamethylenediphenylsilane (63.0 g., 0.25 mole) and methyl cinnamate (8.1 g., 0.05 mole) in a nitrogen atmosphere at 150–165° C., di-tert.-butyl peroxide (0.12 g.) in 1,2,4-trichlorobenzene (7 ml.) was added during 3 hours. After complete addition, the mixture was stirred at 166° C. for 2 hours. A light yellow liquid (3.7 g.) was collected at 157–176° C./0.5 mm. The infrared spectrum of this liquid was essentially identical to that of cyclopentamethylenediphenylsilane with the following exceptions. A strong absorption is present at 9.3$\mu$ which suggests Si—O, and the intensities of the bands at 12.9 and 13.2$\mu$ (phenyl absorptions) have changed and shifted slightly. No carbonyl absorption is present in this sample. This may suggest that an addition adduct was formed which has undergone a thermal rearrangement with the evolution of carbon monoxide and the formation of a Si—O bond. This is somewhat substantiated by the infrared spectrum of the residue (1.4 g., 36 percent yield based on unrecovered ester), an orange viscous liquid, which exhibits saturated ester carbonyl at 5.76$\mu$ of medium intensity and C—O absorption of ester at 8.6$\mu$. Infrared evidence indicates that the expected addition adduct was formed which apparently thermally degrades yielding a more volatile material.

EXAMPLE VIII

Dibenzyltetramethyldisiloxane (78.5 g., 0.25 mole), maleic anhydride (9.9 g., 0.1 mole), 1,2,4-trichlorobenzene (10 ml.) and 5 ml. of di-t-butyl peroxide solution (0.12 g. in 10 ml. of 1,2,4 trichlorobenzene) were charged to a nitrogen-purged flask. The mixture was stirred and heated to 145° C. during 1.5 hours. The remaining peroxide solution was added during one hour at 147° C. The clear yellow solution was stirred at 168° C. for 4 hours. Distillation gave foreruns of starting materials and a yellow viscous liquid (1.7 g.) at 199–217° C. at 0.4 mm. The residual orange solid weighed 2.3 g. The infrared spectrum of the yellow liquid contained absorptions characteristic of the dibenzyltetramethyldisiloxanemaleic anhydride adduct. Infrared study could not distinguish between a mono- or di-adduct.

The viscous yellow liquid was hydrolyzed and a neutralization equivalent of 298 determined from the resulting carboxylic acid. The calculated neutralization equivalent of a mono-adduct is 201.

EXAMPLE IX

Allyltrimethylsilane (34.2 g., 0.3 mole) containing tert-butyl peroxide (0.12 g.) was added during 2 hours under a nitrogen atmosphere to methyl cinnamate (24.3 g., 0.15 mole) at 150–165° C. After the complete addition, the mixture was stirred at 168° C. for 3 hours. The crude product was isolated as the gummy orange distillation residue. Spectrally, it appeared to be a mixture of the isomers made possible by the allylic shift, e.g.,

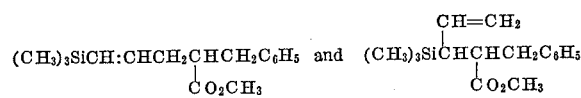

EXAMPLE X

Poly-(dimethylsiloxane) was prepared following the procedure in "Preparative Methods of Polymer Chemistry," p. 258, where dimethyldichlorosilane is added dropwise at 15–20° C. to water. The work-up gives trimer and tetramer as a single fraction by distilling at atmospheric pressure, and higher molecular weight polysiloxanes as distillation residue.

A mixture of cyclic trimer and tetramer, was reacted with maleic anhydride at ca. 90° employing azobisisobutyronitrile as the free radical initiator. Because of the low temperature, short reaction time and/or relatively inactive initiator and hydrogen donor a low yield of crude mixed adducts presumably

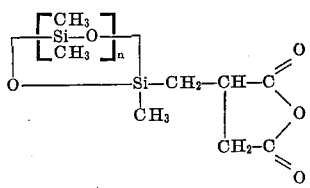

wherein $n$ is equal to 2–3, was obtained.

A similar reaction was attempted using the higher molecular weight polysiloxane and cinnamonitrile, under an ultraviolet light, at 247° C. for 4 hours. Again, possibly because of the use of a relatively inactive initiator, ultraviolet light alone, or possibly siloxanes are in themselves less reactive, the yield of crude adduct presumably

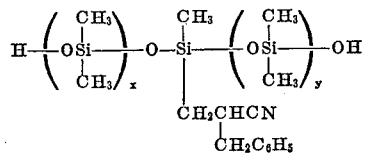

was low.

EXAMPLE XI

During 1 hour at 155° C. cinnamonitrile (18.0 g., 0.14 mole) containing azobisisobutyronitrile (0.46 g.) was added in a nitrogen atmosphere to cyclopentamethylenediphenylsilane (70.4 g., 0.28 mole). The mixture was then stirred at 155° C. for 2 hours and fractionated. A light yellow distillate (3.0 g.) was collected at 141–166° C./0.5 mm. This spectrum is identical with that of the distillate from Example VII.

EXAMPLE XII

In a nitrogen atmosphere at 165° C., di-iso-octyl maleate (20.4 g., 0.06 mole) containing t-butyl peroxide (0.17 g.) was added during 1 hour to nonyl-trichlorosilane (75.6 g., 0.29 mole). The clear colorless solution was stirred at 165° C. for 3 hours. Distillation gave unreacted nonyltrichlorosilane and di-iso-octyl maleate. The residual brown liquid was by infrared analysis a mixture of (presumably) nonyldichloro($\beta$ - carboctoxyacryloyloxy-silane and the desired adduct diisooctyl (trichlorosilylnonyl)succinate with the first predominating.

EXAMPLE XIII

At 85° during 1 hour, crude wet crotononitrile (6.7 g., 0.1 mole) containing azobisisobutyronitrile (0.33 g.) was added in a nitrogen atmosphere to allyl-trimethylsilane (58.5 g., 0.5 mole). The reaction solution was stirred under an ultraviolet light extending into the solution for 2 hours at 85° C. Distillation of the reaction mixture left, as an orange residue, a low yield of the crude adduct, presumably as a mixture of isomers. Its formation was established by spectral analyses and vapor phase chromatographic fractionation.

EXAMPLE XIV

Tri-n-hexylsilane (69.0 g., 0.25 mole), maleic anhydride (4.95 g., 0.05 mole), 1,2,4-trichlorobenzene (10 ml.) and 4 ml. of di-t-butyl peroxide solution (0.12 g. in 8 ml. of 1,2,4-trichlorobenzene) were charged to a nitrogen purged flask. The mixture was stirred and heated to 150° C. during 2 hours when the remaining 4 ml. of peroxide solution was added. The clear reaction mixture turned yellow after stirring at 150–170° C. for 5 hours. The more volatile components were removed by distillation to a pot temperature of 210° at 0.50 mm. The residue (15.0 g.) was distilled thru a 13 cm. Vigreaux column to give the following fractions:

| Fraction | Bath T., ° C. | Head T., ° C. | Pressure, mm. | Wt. g. | Remarks |
|---|---|---|---|---|---|
| 1 | To 260 | To 178 | 0.40 | 8.68 | Yellow liquid. |
| 2 | 260–320 | 178–206 | 0.35 | 0.63 | Orange liquid. |
| 3 | 320–320 | 206–218 | 0.35 | 0.30 | Viscous orange liquid. |
| Residue | | | | 3.50 | Dark brown liquid. |

Analyses of these fractions indicated that they are mixtures containing, as the major component, the known trihexylsilylsuccinic anhydride (I) and its pyrolitic rearrangement derivatives. The mixtures also contain the expected adducts (dihexylsilylhexyl)succinic anhydride (II) and its pyrolytic products, such as (III).

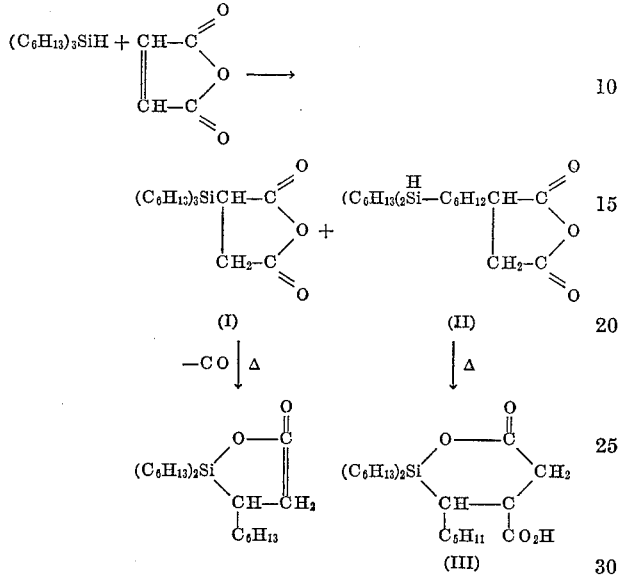

EXAMPLE XV

Allyltrimethylsilane 54.0 g. (0.475 mole) and itaconic anhydride 26.8 g. (0.238 mole) were reacted in the presence of 0.4 g. azobisisobutyronitrile. The orange viscous residue, by infrared analysis indicated free radical addition had occurred accompanied by an allylic shift according to the reaction

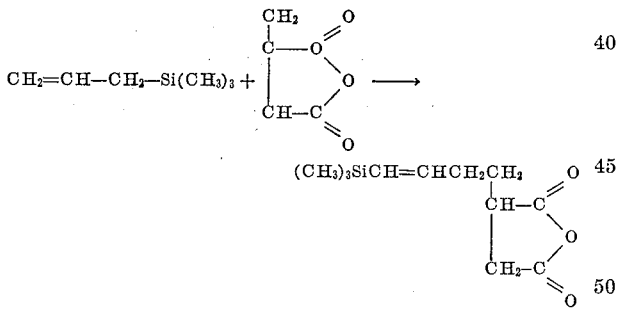

We claim:
1. A method of making a functionally substituted organometallic compound comprising reacting at a temperature of 50–250° C. in the presence of a free radical catalyst
   (a) an alpha hydrogen containing organometallic compound containing a metal portion selected from the group consisting of silicon, germanium, tin and lead and having no metal-hydrogen bonds, with
   (b) an activated olefin containing an olefinic group alpha to an activator radical selected from the group consisting of carboxy and a radical hydrolyzable to carboxy.
2. A method of making functionally substituted organometallic compounds comprising reacting at a temperature of 50–250° C. in the presence of a free radical forming initiator, an alpha hydrogen containing organometallic compound having no metal-hydrogen bonds wherein the metallic portion is an element of Group IV-A of the Periodic Table having an atomic number of 14–82 inclusive, with an activated olefin having a double bond in an alpha position relative to an electrophilic activator group selected from the group consisting of cyano, carboxy, carbalkoxy, carboxamide, anhydride, and imide.

3. A method of making functionally substituted organometallic compounds comprising reacting at a temperature of 50–250° C. in the presence of a free radical forming initiator
   (a) a metallo-organic compound of the formula: $R_2CHMY_y$ wherein M is an element of Group IV–A of the Periodic Table having an atomic number of 14–82 inclusive; each R is a member selected from the group consisting of hydrogen, a univalent hydrocarbon residue having 1–17 carbon atoms selected from the group consisting of alkyl having 1–17 carbon atoms, alkenyl having 2–17 carbon atoms, cycloalkyl having 3–8 annular carbon atoms, phenyl and benzyl, a heterocyclic ring having 3–8 annular carbon atoms when taken collectively with CHM, the heteroatom of said heterocyclic ring selected from oxygen and M, recurring groups of the general formula $+(CH_2)_nMY_2+$ wherein $n$ is an integer having a value of 1–8 when taken collectively with CHM, and a saturated carbocyclic ring of 3–8 annular carbon atoms when taken collectively with the other R and CH; Y is independently selected from the group consisting of halogen, phenyl, benzyl, $R_2CH$, and a poly(M-oxane) of 2–500

units when taken collectively with M; and $y$ is an integer having a value between 1 and 3 inclusive, such that the total substituents of M are always 4; with
   (b) an activated olefin of the formula:

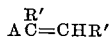

wherein each R' is a member selected from the group consisting of hydrogen, lower alkyl, phenyl, cycloalkene rings of 5–8 annular carbon atoms when taken collectively with the other R' and C=CH, and a cyclic member of 5–6 annular atoms selected from the group consisting of an organic acid anhydride and organic acid imide when taken collectively with A, the other R's and the carbon atoms to which the A and the R's are attached; and A is a member selected from the group consisting of cyano, carboxy, COOR wherein R is selected from alkyl and cycloalkyl having from 1–8 carbon atoms, carboxamide having from 1–8 carbon atoms and cyclic carboxylic anhydride and imide.
4. A method according to claim 3 wherein M is silicon, R is a univalent hydrocarbon residue having 1–17 carbon atoms, Y is $R_2CH$ wherein R is as defined above, and the two R's taken collectively with A and the carbon atoms to which the A and the R's are attached form a cyclic anhydride of 5–6 annular atoms.
5. A method according to claim 3 wherein M is tin, R is hydrogen, Y is $R_2CH$ wherein R is as defined above, and the two R's taken collectively with A and the carbon atoms to which the A and the R's are attached form a cyclic anhydride of 5–6 annular atoms.
6. A method according to claim 3 wherein M is germanium, R is a univalent hydrocarbon residue having 1–17 carbon atoms, Y is phenyl or benzyl, R' is hydrogen, and A is cyano.
7. A method according to claim 3 wherein M is lead, R is hydrogen, Y is $RCH_2$ wherein R is as defined above, R' is hydrogen and A is cyano.

References Cited

UNITED STATES PATENTS 3,360,338   12/1961   Ashby _____ 260—448.2

NICHOLAS S. RIZZO, *Primary Examiner.*

B. I. DENTZ, *Assistant Examiner.*